United States Patent [19]

Weitzel et al.

[11] Patent Number: 4,617,449

[45] Date of Patent: Oct. 14, 1986

[54] HEATING DEVICE FOR UTILIZING THE SKIN EFFECT OF ALTERNATING CURRENT

[75] Inventors: Harold B. Weitzel, Strongsville; David G. Parman, Medina, both of Ohio

[73] Assignee: Ricwil, Incorporated, Brecksville, Ohio

[21] Appl. No.: 732,074

[22] Filed: May 9, 1985

Related U.S. Application Data

[62] Division of Ser. No. 563,165, Dec. 19, 1983, Pat. No. 4,532,375, which is a division of Ser. No. 313,937, Oct. 22, 1981, Pat. No. 4,436,565.

[51] Int. Cl.[4] .......................... H05B 3/00; H02G 15/10

[52] U.S. Cl. .................................. 219/301; 174/88 R; 219/300; 219/10.51

[58] Field of Search ............. 174/88 R, 88 C, 102 SC, 174/105 SC, 106 SC, 107, 110 FC, 120 SC; 219/301, 306, 10.51, 300

[56] References Cited

U.S. PATENT DOCUMENTS

| | | | |
|---|---|---|---|
| 2,480,298 | 11/1943 | Happoldt, Jr. | 428/389 |
| 2,528,523 | 11/1950 | Kent | 428/379 |
| 2,708,215 | 5/1955 | Kaganoff | 174/110 R |
| 2,717,216 | 9/1955 | Arone | 428/413 |
| 2,830,919 | 4/1958 | Schatzel | 428/389 |
| 2,930,083 | 3/1960 | Vostovich et al. | 264/174 |
| 3,085,083 | 4/1963 | Schreyer | 525/326.2 |
| 3,096,210 | 7/1963 | Boonstra | 428/368 |
| 3,259,684 | 7/1966 | Wakefield | 174/36 |
| 3,278,673 | 10/1966 | Gore | 174/120 R |
| 3,293,407 | 12/1966 | Ando | 219/301 |
| 3,433,891 | 3/1969 | Zysk et al. | 174/120 R |
| 3,515,837 | 6/1970 | Ando | 219/6.5 |
| 3,660,592 | 5/1972 | Anderson | 174/114 R |
| 3,671,663 | 6/1972 | Seifert et al. | 174/120 SC |
| 3,769,085 | 10/1973 | Matsubara | 174/120 C X |
| 3,790,697 | 2/1974 | Buckingham | 174/102 |
| 3,805,218 | 4/1974 | Voida | 174/107 X |
| 3,878,319 | 4/1975 | Wahl | 174/106 SC |
| 3,887,761 | 6/1975 | Gore | 174/110 R |
| 4,008,367 | 2/1977 | Sunderhauf | 174/107 |
| 4,109,098 | 8/1978 | Olsson et al. | 174/106 SC |
| 4,267,098 | 5/1981 | Hartwimmer et al. | 174/110 FG |
| 4,436,565 | 3/1984 | Weitzel et al. | 156/49 |
| 4,532,375 | 7/1985 | Weitzel et al. | 174/107 |

FOREIGN PATENT DOCUMENTS

| | | | |
|---|---|---|---|
| 204410 | 11/1955 | Australia | 174/102 SC |
| 1021836 | 12/1974 | Canada . | |
| 2514891 | 10/1976 | Fed. Rep. of Germany | 174/107 |
| 2256622 | 7/1975 | France | 219/301 |

*Primary Examiner*—Arthur T. Grimley

*Assistant Examiner*—Morris H. Nimmo

*Attorney, Agent, or Firm*—Watts, Hoffmann, Fisher & Heinke Co.

[57] ABSTRACT

An improved power cable for a heating system that utilizes the skin effect of alternating current, and a method and apparatus for joining lengths of the improved cable. In one embodiment, the cable includes a stranded copper conductor (20) surrounded by a semiconductive layer (22) formed by carbonized tetrafluoroethylene (TFE) tape which is surrounded by a primary insulation layer (24) formed by pressure extruded, perfluoroalkoxy resin (PFA), the thickness of which is determined by an equation that considers the eccentric positioning of the power cable in a heat tube (14). In a second embodiment, the cable comprises a central conductor (30) surrounded by a semiconductive layer (32), followed by a primary insulation layer (34) formed by pressure extruded PFA. A shield layer (36) formed by a layer of semiconductor material (38) and several helically wrapped drain wires (40) surrounds the primary insulation layer. A protective PFA jacket (42) is pressure extruded over the shield layer. Lengths of the improved cable are joined by first removing predetermined portions of the insulating and semiconductor layers from a terminal end (50) and a feed end (52) of respective cable lengths. The exposed conductors (30') are mechanically joined and covered by a spirally wrapped carbonized TFE tape (60). An insulating layer (62) is formed over the junction by spirally wrapping uncured, nonadhesive tetrafluoroethylene tape with a 50% overlap and then heat fusing the layer. Shield extensions (66), (68) are formed by spirally wrapped, carbonized TFE tape that extend into noncommunicating, isolated overlapped relationship from the respective shield layers (38) of each cable end. The entire splice is covered with a layer of insulation (73) formed by uncured, nonadhesive TFE tape which is subsequently heat fused. The drain wire (40) from the terminal end is grounded to the heat tube.

4 Claims, 8 Drawing Figures

HEATING DEVICE FOR UTILIZING THE SKIN EFFECT OF ALTERNATING CURRENT

This is a division of application Ser. No. 563,165, filed 12/19/83, now U.S. Pat. No. 4,532,375 allowed 2/20/85, which is a divisional application of Ser. No. 313,937, filed 10/22/81, now U.S. Pat. No. 4,436,565 dated 3/13/84.

DESCRIPTION

1. Technical Field

The present invention relates generally to heating systems, and in particular to a heating device for maintaining a pipeline or the like at an elevated temperature utilizing the skin effect of alternating current.

2. Background Art

"Heat tracing" systems for maintaining a liquid carried in a pipeline at an elevated temperature are well known in the art. Early systems employed electric resistance heaters running the length of the pipeline to provide the necessary heat or, alternately, employed conduits attached to the exterior of the pipeline through which steam or a high temperature liquid was conveyed. Many of these systems are energy intensive and prohibitively expensive to operate at current energy costs.

More recently, a system utilizing the skin effect of alternating current for generating heat has been suggested. A method and apparatus for heating a pipeline utilizing this principle was disclosed in U.S. Pat. No. 3,293,407, issued to Ando, which is hereby incorporated by reference. According to this patent, the basic elements of the skin effect current heating system are a ferromagnetic tube and an insulated conductor disposed within the tube. In a simple embodiment of this system, one end of the conductor is connected to one end of the ferromagnetic tube and the opposite ends of the conductor and tube are connected to a suitable AC source. According to the principle of operation, the electromagnetic fields generated between the tube and the conductor, cause the current in the tube to be concentrated at its inner surface. This current concentration at the inner surface of the pipe generates heat. By suitably joining the heating tube to a pipeline, the heat generated can be transmitted to the liquid transported through the pipeline. It has been found that this type of pipeline heating system is very economical and reliable in many applications as compared to the electric resistance and steam based heat tracing systems.

In many, if not most applications to date for skin effect heating systems, the power cable disposed within the heating tube operated at a temperature less than 150° C. and at an applied voltage of less than 2 KV. For these moderate heating applications, commercially available power cable could serve as the insulated conductor without sacrificing performance and/or cable longevity. Recently, however, it has been found desirable to be able to provide a skin effect heating system for a comparatively long pipeline and to maintain the material conveyed in the pipeline at a temperature in excess of 120° C. In one particular heating application, it was necessary to provide a skin effect heating system for a 20 mile long pipeline carrying liquified sulfur. To provide the requisite heating for this particular application, the power cable must operate at a continuous temperature of 210° C., with an applied voltage of up to 5 KV RMS.

Although power cables, capable of operation at 5 KV when used in more conventional applications, were available from cable manufacturers, it was found that these commercially supplied cables could not meet the required parameters when placed inside a heating tube operating at 210° C. It must be remembered that in conventional applications for power cable, the cable is strung in open air or alternately placed in a conduit or raceway. In the latter case, the conduit serves only as a protective device and not as a current carrying conductor as does the heat tube in a skin effect heat system. When commercially available cables were confined within the heating tube, the added voltage stresses and high temperature would combine to cause the premature failure of the cable. It is believed that the premature failures were due in part to the presence of insulation damaging, corona.

In designing power cables to meet specified operating parameters, cable manufacturers tend to apply well known and in some cases simplified equations to arrive at the required insulation thickness, such as $$S = V/T$$

where S is the mean stress across the insulation; V is the applied voltage and, T is the insulaton thickness. In general, the maximum stress S that an insulation can withstand is known and therefore the required thickness T of the insulation can be easily calculated.

For calculating the required insulation thickness for an electrical system utilizing concentric conductors, i.e. a shielded cable that comprises a central conductor surrounded by and insulated from, an outer conductor, cable designers generally apply the stress equation $$S = \frac{KV}{r\,1_n \frac{r_{oc}}{r_{ic}}} \quad \text{[eq. 1]}$$

where S is the voltage stress at a radius r from the center of the inner conductor, usually expressed in volts/mil; K is the dielectric constant for the insulating material; V is the applied voltage; $r_{oc}$ is the radius of the outer conductor; and $r_{ic}$ is the radius of the inner conductor.

For an electric system having true "concentricity" between the conductors, the stress equation yields an adequate insulation thickness. In a typical skin effect heating system, however, the insulated power cable normally lies on the bottom of the heat tube and is therefore, in reality, eccentrically positioned with respect to the outer conductor (the heat tube). The above described stress equation does not address this eccentricity and consequently yields an inadequate amount of insulation. The stresses placed on the cable especially in high temperature applications often resulted in premature failure. Thus it has been found that commercially available power cable, designed using conventional methods and equations, was unacceptable for high temperature, high voltage skin effect heating systems.

In fabricating a skin effect heating system, the heat tube is generally fastened or welded, to the pipeline as it is assembled. A power cable is then pulled through the heating tube and suitably attached to terminals and/or power sources. For very long pipelines, the heat tube is formed in sections and a length of power cable is pulled through each section and then spliced or joined to an adjacent length of cable.

The splicing of adjacent lengths of power cable is very critical, for not only must the junction withstand the high operating temperature and voltage, it is equally important to insure that the conductor junction is not in itself a source of impedance which could produce a "hot spot" at the splice. Canadian Pat. No. 1,021,836 to Ando illustrates a power cable construction as well as a method for joining two lengths of the power cable. Although the illustrated cable and splice perform satisfactorily at moderate operating temperatures and voltages, it is believed that they could not withstand both an applied voltage of 5 KV and a continuous operating temperature of 210° C.

DISCLOSURE OF THE INVENTION

The present invention provides a new and improved high temperature, high voltage electrical power cable especially suited for a heating system utilizing the skin effect of alternating current. The invention also provides apparatus and method for serially joining lengths of the improved power cable.

Two embodiments of the improved power cable are disclosed. In one embodiment, the cable can withstand a continuous applied voltage of at least 3 kv; in the second embodiment, the cable can withstand a continuous applied voltage of at least 5 kv. Both cable embodiments can withstand a continuous operating temperature of at least 210° C. and all the above specified parameters are met with the cable disposed inside a ferromagnetic heating tube.

The cable of the first embodiment, appears conventional in construction and includes a primary conductor preferably constructed of stranded, nickel plated copper surrounded by a carbonized, fluorocarbon polymer tape, preferably carbonized tetrafluoroethylene that forms a semiconducting layer around the conductor tending to smooth out voltage stresses caused by conductor irregularities. A layer of insulation surrounds the semiconductor layer, preferably formed by an extrudable fluorocarbon polymer, such as perfluoroalkoxy resin. However, unlike the prior art, the insulation thickness is determined by an equation that takes into consideration the added voltage stresses placed on the power cable by the skin effect heating system environment. In particular, the insulation thickness is determined by the expression:

$$S + \frac{KV\left(1 + \frac{D}{r_{oc}}\cos\theta\right)}{r\, l_n \frac{r_{oc}}{r_{ic}}} \qquad \text{[eq. 2]}$$

where S is the voltage stress usually expressed in volts/mil at a given radius r; K is the dielectric constant for the insulation material; V is the applied voltage (in this instance 3 kv); $r_{oc}$ is the radius of the tube; $r_{ic}$ is the radius of the inner conductor; D is a displacement factor and is equal to the radius of the tube minus the radius of the wire; and, $\theta$ is the angular displacement of the radius of interest with 0° being the position where the cable is closest to the heat tube. The maximum voltage gradient occurs along the radial line extending between the inner conductor and the heat tube at the point where the power cable is closest to the heat tube. The displacement angle of this radial line is 0°.

The cable of the second embodiment includes a primary conductor preferably constructed of a stranded, nickel plated copper. A carbonized, fluorocarbon polymer tape, preferably carbonized tetrafluorethylene, is spirally wrapped around the copper conductor to form a semi-conducting layer which tends to smooth out voltage stresses caused by irregularities in the conductor. A layer of primary insulation overlies the semi-conductor layer and is formed by an extrudable fluorocarbon polymer, preferably perfluoroalkoxy resin. A shield layer surrounds the primary insulation and preferably comprises another semiconductor layer formed by spirally wrapping a carbonized tetrafluoroethylene tape around the primary installation and also includes at least one but preferably several drain wires helically wound around the semiconductor tape layer. Finally, an outer insulation jacket surrounds the shield layer and is formed by an extrudable fluorocarbon polymer, preferably perfluoroalkoxy resin.

The disclosed power cable has been found to perform extremely well in a heating device that utilizes the skin effect of alternating current. Moreover, testing indicates that a relatively long life even under continuous use at the maximum operating parameters can be realized. Additionally, it has been found that the cable can be easily pulled through the heat tube during fabrication of the heating system because it is substantially resistant to mechanical damage during handling.

The preferred embodiment of the invention also includes a method and apparatus for splicing together the ends of serially disposed lengths of power cable. For purposes of explanation, each cable length is termed to have a feed end and a terminal end, the lengths of cable being connected by joining the terminal end of one cable to the feed of another cable. The splicing method is especially advantageous for connecting high temperature, high voltage cables that comprise a conductor surrounded by a semiconductor layer, an insulating layer, a shield layer including a drain wire, and an insulating jacket, such as the power cable of the second embodiment. Although the splicing method will be described in connection with the electrical power cable described above, it should be understood that the method is equally applicable to similarly constructed power cables presently in use or which may be developed in the future.

To facilitate the description of the splicing method, it will be described in conjunction with the power cable disclosed above. The steps for achieving a preferred splice are as follows: first, the outer insulation jacket is removed from the feed and terminal ends of the power cable lengths to be joined in order to expose a predetermined length of the shield layer (which comprises a semiconductor layer surrounded by drain wires). Next, a length of conductor is exposed by stripping away the semiconductor layer, the insulation layer, and shield layer for relatively short distance from the ends of the cable. A section of the remaining exposed shield layer is then removed to expose a short length of the primary insulation just behind the exposed primary conductor. In the preferred embodiment, this exposed primary insulation section is then tapered downwardly towards the exposed conductor.

Once the ends of the cable to be joined have been prepared as disclosed above, they are joined together by first mechanically joining the exposed conductor ends with a mechanical joining device or by welding. A semiconducting material, preferably carbonized tetrafluoroethylene tape is then spirally wrapped around the joined conductors. Insulation, preferably tetrafluoroethylene tape is then wrapped over the semiconducting tape and into overlapping contact with the tapered insulation layer of each cable end. The wrapped insulation is then heat fused by a suitable heat source such as a hot air gun.

An extension of the shield layer of each cable is then formed by first wrapping semiconductor tape, preferably carbonized tetrafluoroethylene, from the shield layer of the end of one power cable to a point located on the other side of the conductor joint but spaced from and out of contact with the shield layer of the other cable end. A layer of insulation is then wrapped around the semiconductor layer forming the shield extension to completely insulate the shield extension from additional layers. The shield layer of the other length of cable is then extended in a similar manner by wrapping semiconductor tape from the exposed shield layer on the other cable end to a position spaced from the shield layer of the one length of cable. Finally, the entire splice is wrapped by an insulating tape, preferably tetrafluoroethylene, from the insulation jacket of the end of one length to the insulation jacket of the other length of power cable. The drain wire of one length of power cable is then electrically connected with the ferromagnetic tube at or near the point of the splice. Preferably, the terminal end of the power cable is the one connected.

With the preferred splicing method, impedance at the juncture of the conductors is minimized and the splice itself can withstand the same operating parameters, i.e., an applied voltage of 5KV and a continuous operating temperature of 210° C., as the power cable. Preferably, the splice is protected from mechanical damage by a suitable enclosure. Heat fusing the insulating layers minimizes the generation of corona thus increasing the reliability of the splice.

Additional features and a fuller understanding of the present invention will be obtained in reading the following detailed description made in connection with the accompanying drawings.

BEST MODE FOR CARRYING OUT THE INVENTION

Figure 1:
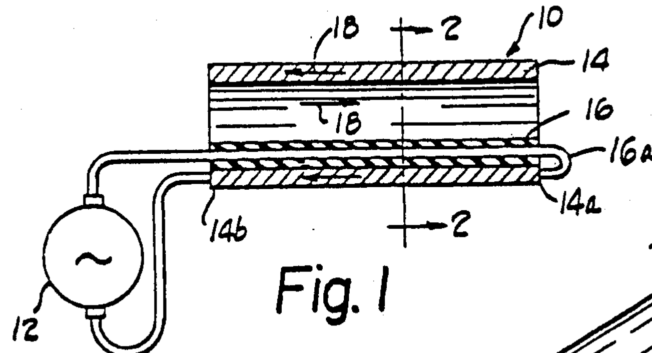
FIG. 1 schematically illustrates a heating system utilizing the skin effect of alternating currents.

A heating system utilizing the skin effect of alternating current is schematically illustrated in FIG. 1. Broadly speaking, it comprises a heating element indicated generally by the reference character 10 connected to a suitable source 12 of alternating current. The heating element 10 includes a ferromagnetic tube 14 through which a power cable 16 including an insulating conductor 16*a* is disposed. One end of the conductor 16*a* is connected to one end 14*a* of the heat tube 14; the other end of the cable is connected to the AC source. The other end 14*b* of the heat tube 14 is connected to the AC source so that a circuit is formed in which current from the AC source flows through the insulated cable, and returns to the source via the heat tube 14, as indicated by the directional arrows 18.

Figure 2:
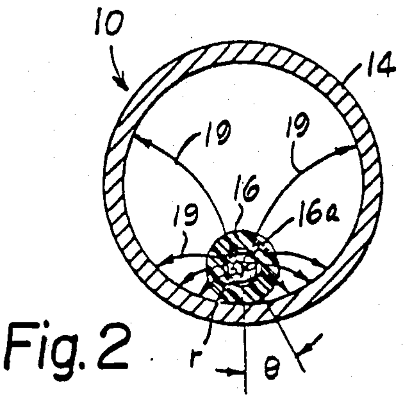
FIG. 2 is an enlarged, sectional view of the heating element as seen from the plane indicated by the line 2—2 in FIG. 1.

In theory, the insulated power cable 16 is centrally located within the heat tube so that a uniform electric field between the cable conductor and heat tube exists. However, in reality, the power cable rarely if ever is positioned concentrically with the heat tube. Typically, the cable rests on the bottom of the heat tube as illustrated in FIGS. 1 and 2.

Those skilled in the art will appreciate that the voltage stresses placed on the insulation of the power cable will depend on the position of the cable within the heating tube. As is well known, the voltage stress on the insulation of concentric conductors is given by the expression:

$$S = \frac{KV}{r\,l_n \frac{r_{oc}}{r_{ic}}} \qquad \text{[eq. 1]}$$

where S is the voltage stress at a radius r from the center of the inner conductor, usually expressed in volts/mil; k is the dielectric constant for the insulating material between the outer and inner conductors; V is the applied voltage; $r_{oc}$ is the radius of the outer conductor; and, $r_{ic}$ is the radius of the inner conductor. It is known to employ the above equation to arrive at an insulation thickness between concentric conductors.

The voltage stress on an "eccentrically" located conductor, as shown in FIG. 2 at a given radius from the center of the conductor 16*a,* will vary depending on the distance between the tube 14 and the conductor 16*a.* The arrows 19 represent the lines of stress between the conductor 16*a* and the heat tube 14. In the case of concentric conductors, the voltage stress is constant at any given radial distance. In the case of eccentrically located conductors, the voltage stress at a specific radial distance is a function of an angle $\theta$ with the angle $\theta$ equalling zero at the point where the cable is closest to the heat tube, in this instance, the very bottom of the heat tube 14, as seen in FIG. 2. It will also be appreciated, that the voltage stress on the insulation will be least, at a radial point 180 degrees from the bottom of the heat tube.

It should be apparent that employing equation 1 to arrive at an insulation thickness for a power cable to be used in a skin effect heating system will result in an inadequate amount of insulation, potentially resulting in premature failure of the cable. Secondly, in high temperature applications, an insulation must be used which can sustain the continuous high temperature to which the cable is subjected. Unlike more conventional applications of power cable, the applied voltages and operating temperature are continually maintained on the cable commencing with the activation of the heating system. Typically, the voltage and temperature are maintained continuously until the heating system is turned off for maintenance or for repair of a failure. In heating applications where a material such as sulfur must be maintained at a critical temperature in order to prevent solidification in the pipeline, it is critical that the cable be reliable and have long life operating under the rather severe temperature and voltage conditions.

In order to provide a power cable with sufficient insulation for use in a skin effect heating system, such as shown schematically in FIG. 1, the added voltage stresses due to the eccentric positioning of the power cable within the heat tube must be considered. It has been found that the following expression:

$$S = \frac{KV\left(1 + \frac{D}{r_{oc}}\cos\theta\right)}{r\, l_n \frac{r_{oc}}{r_{ic}}} \qquad \text{[eq. 2]}$$

provides a somewhat more accurate measure of the voltage stresses at a given radius r from the center of the inner conductor, where K is the dielectric constant for the insulating material; V is the applied voltage; $r_{oc}$ is the inside radius of the heat tube 14; $r_{ic}$ is the radius of the inner conductor 16*a*; D is a displacement factor and is equal to the radius of the tube ($r_{ic}$) minus the radius of the overall power cable 16; and, $\theta$ is the angular displacement of the radius of interest with respect to a radial line extending between the center of the conductor 16*a* and the point at which the cable 16 touches the heat tube 14. It should be noted, that at a given radial distance from the center of the inner conductor, the voltage stresses will vary depending on the angular displacement of that radial point from the position at which the inner conductor is closest to the outer conductor, i.e., the bottom of the heat tube. The cos $\theta$ term in the numerator of the equation takes this into account.

Figure 3:
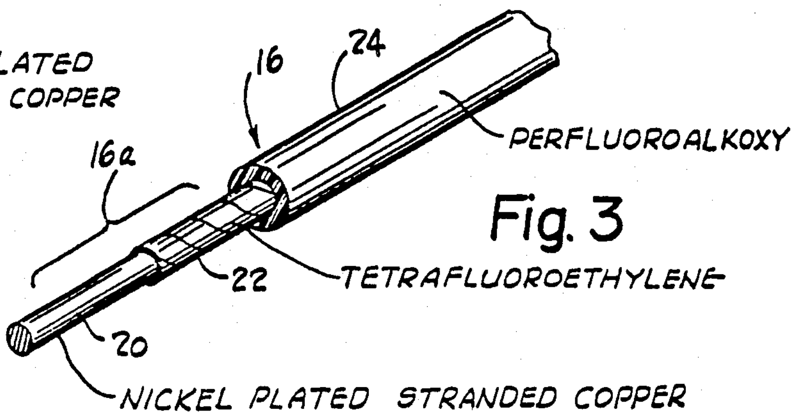
FIG. 3 illustrates one embodiment of a power cable constructed in accordance with a preferred embodiment of the invention.

According to the invention, the above referenced equation is used to arrive at an insulation thickness for a power cable for use in a high temperature, high voltage skin effect heating system. In particular, the cable construction illustrated in FIG. 3 is the result of the application of equation 2 disclosed above. The illustrated cable is capable of withstanding a continuous operating temperature of 210° C. and a continuous applied voltage of 3 KV. Moreover, the cable meets these parameters when placed within a sealed ¾" diameter heat tube.

The cable comprises a stranded copper conductor 20, preferably nickel plated, surrounded by a semi-conductive layer 22 that comprises a carbonized fluorocarbon polymer. It has been found that commercially available carbonized, tetrafluoroethylene (TFE) tape is a suitable material for this layer 22. Preferably, the tape is spirally wrapped, with 50% overlap, over the conductor 20 until a 10 mil layer is deposited.

According to the invention, the semi-conductive layer 22 is surrounded by a insulation jacket 24, the thickness of which, is determined by equation 2 disclosed above. In order to produce a jacket, that is able to withstand the high operating temperature (210° C.), a material from the Teflon family (Teflon is a trademark of E. I. duPont de Nemours & Co.) was selected. In particular, it has been found that Teflon 340 known as perfluoroalkoxy resin (PFA) provides a suitable material for the insulation. This particular Teflon is pressure extrudable which is the preferred method for forming the insulation layer in order to minimize the creation of corona inducing voids.

It is well known that in order to prevent insulation breakdown, the voltage gradient across the insulation must be maintained below a threshold value, usually determined through experimentation and test. For PFA, the maximum permissible voltage gradient is known to be approximately 180 volts per mil with a reasonable safety factor.

In order to determine the proper insulation thickness for a power cable used in a skin effect heating system, it will be appreciated that one must not only consider the voltage stress on the insulation jacket surrounding the conductor 20 but also the stress in the air surrounding the cable. It should be recognized that the total insulation medium between the inner conductor 20 and the heat tube comprises both the insulation jacket 24 surrounding the conductor 20 and the air surrounding the jacket. It is generally held that partial discharge in air may occur when the voltage gradient exceeds 35 volts per mil. Thus, in calculating the appropriate insulation thickness, the voltage gradient that will exist in both the air and the insulation jacket must be addressed.

The first step in determining the appropriate insulation thickness is to use equation 2 to calculate an insulation thickness that will produce a voltage stress less than 180 volts per mil at the interface between the inner conductor 20 (including layer 22) and the insulation 24. For purposes of calculation, the radius r of the interface is equal to the radius of the conductor 20 plus 1 mil. The dielectric constant for Teflon is approximately 2.06. It will be recognized that the maximum voltage gradient will exist between the conductor 16*a* and the heat tube 14 at the point where the power cable and heat tube are the closest, i.e., the point at which the power cable 16 contacts the tube 14 (shown in FIG. 2). As seen in FIG. 2, this point is usually the bottom of the heat tube 14 for in most instances the power cable 16 rests in this position. At this position, $\theta = 0°$.

After a tentative insulation thickness for the jacket 24 has been calculated, the voltage gradient that will exist in the air surrounding the power cable is then calculated to determine whether the voltage gradient in the air is less than 35 volts per mil. In calculating this gradient, the outer radius of the power cable 16 is used and a dielectric constant of 1 is assumed for air.

To arrive at a final insulation thickness for the jacket 24, the value for insulation thickness is varied until the voltage gradient for the air immediately surrounding the power cable and the voltage gradient at the conductor boundary are both below the maximum permissible limits of 35 volts per mil and 180 volts per mil respectively. In general, the actual insulation thickness used will be greater than that calculated to provide an adequate safety factor to allow for nonconcentricity in the power cable as well as other defects. It has been found that equation 2 yields an insulation thickness that is usually more than 50% greater than that yielded by more conventional stress equations and testing has confirmed that the calculated thickness more closely approximates the required insulation thickness for a skin effect heating system.

A power cable for a skin effect heating system, approximately 7 miles in length, was constructed in accordance with the present invention. Power requirements dictated the need for a #6 AWG conductor size. To provide added flexibility to the cable in order to facilitate fabrication and assembly, a class H stranding was selected resulting in a conductor diameter of 210 mils. A 10 mil semi-conductor layer (indicated by the reference character 22 in FIG. 3), formed by carbonized Teflon tape, was found to be satisfactory. The heat tube in which the power cable was disposed, comprised commercially available ¾" steel pipe having a nominal inside diameter of 824 mils.

The application of equation 2, using the dimensions delineated above and assuming a dielectric constant of 2.06 and 1.0 for PFA and air, respectively, yielded an insulation jacket thickness of substantially 65 mils, including a reasonable safety factor. Testing confirmed that the power cable was capable of operating at a temperature of 210° C. with an applied voltage of 3 KV RMS.

Figure 4:
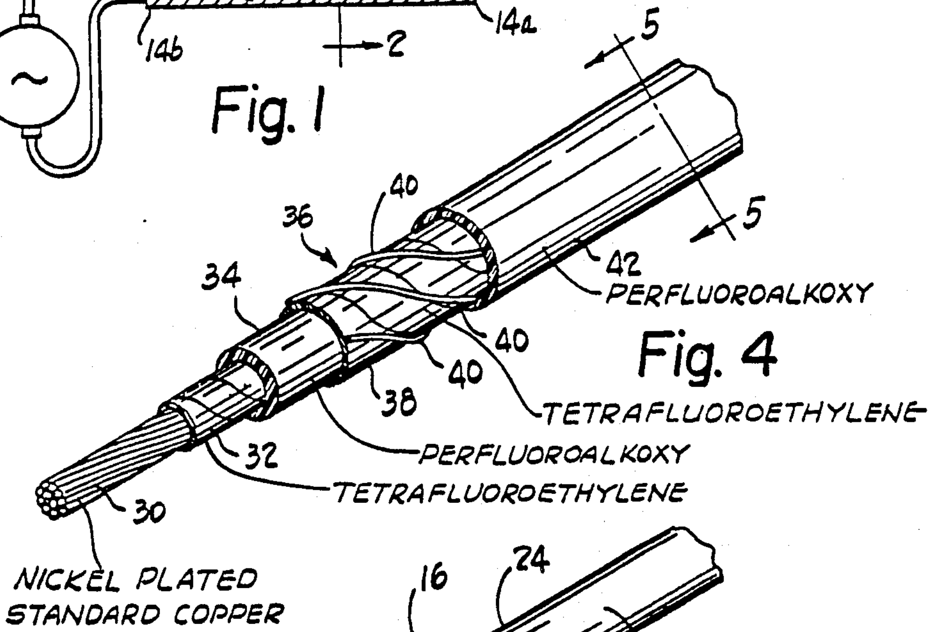
FIG. 4 illustrates another embodiment of the power cable of the present invention.
Figure 5:
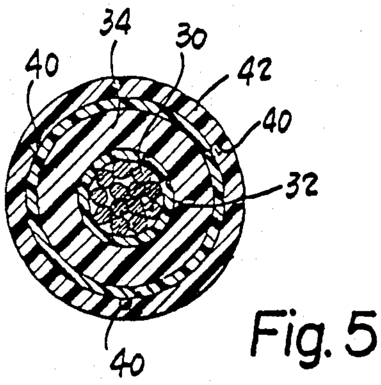
FIG. 5 is an enlarged, sectional view as seen from the plane indicated by the line 5—5 in FIG. 4.

Referring now to FIGS. 4 and 5, the construction of a 5 KV power cable for use in a skin effect heating system operating in excess of 210° C., is illustrated. The cable is of a shielded design and comprises a central conductor 30, preferably nickel plated copper surrounded by a 10 mil semiconductive layer 32, preferably formed by carbonized Teflon tape, such as tetrafluoroethylene (TFE), spirally wrapped over the conductor 30 with a 50% overlap. The semiconductive layer 32 is surrounded by a primary insulation layer 34 formed by a pressure extruded Teflon, preferably perfluoroalkoxy resin (PFA). The primary insulation 34 is in turn surrounded by a shield layer, indicated generally by the reference character 36, formed by a 10 mil layer of semiconductor material 38 preferably comprising spirally wrapped carbonized Teflon tape, and at least 3 helically wrapped drain wires 40. The drain wires are preferably 24 gauge. The shield layer 36 is covered by a 20 mil Teflon jacket 42, preferably pressure extruded PFA, that serves to insulate the shield layer 36 from the heat tube 14 and also protects the shield layer 36 from abrasion damage during fabrication.

A power cable was constructed in accordance with the second embodiment of the invention for use in a ¾" conduit. Like the first embodiment, the nominal inside diameter of the conduit was 824 mils and the conductor size chosen was #6 AWG with a class H stranding, resulting in a conductor diameter of 210 mils. The primary insulation 34 was determined by equation 1, which yielded an insulation thickness of at least 60 mils including a reasonable safety factor.

It has been found that the illustrated cable construction can withstand a continuous operating temperature of 210° C. and a continuous supply voltage of 5 KV with the power cable disposed within a sealed ¾" ferro magnetic heat tube. The problem of partial discharge in air is obviated in this illustrated cable due to the shielded construction which in effect results in a concentric conductor type of cable. As discussed above, with a concentric conductor cable, equation 1 is employed to calculate the required insulation thickness between the inner conductor 30 and the outer conductor (the shield layer 36).

In determining the insulation thickness of the outer protective jacket 42, equation 2 must be employed and the potential between the shield layer 36 and the heat tube 14 must be considered. In relatively short skin effect heating systems (less than 3 miles), the potential between the shield 36 and heat tube 14 will be relatively low and the mechanical strength requirements of the protective jacket will dictate its thickness. In relatively long skin effect heating systems (in the order of 5 miles or more), if the shield layer is not periodically grounded to the heat tube, the potential between the shield 36 and the heat tube 14 can be significant due to the impedance in the cable and the tube. In this situation, equation 2 must be applied to derive the requisite insulation thickness for the jacket 42, taking into account the maximum permissible gradient that can exist in the jacket and the air surrounding the jacket. As discussed above, for a PFA Teflon, the maximum permissible gradient is approximately 180 Volts per mil, and for air is approximately 35 volts per mil (with appropriate safety factors).

The power cable illustrated in FIGS. 4 and 5, is intended for use in a skin effect heating system in excess of 3 miles in length with grounding of the shield 36 at 1000 foot intervals. With this heating configuration, it was found that the mechanical strength requirements dictated a 20 mil protective jacket 42 of PFA. With the frequent grounding of the shield 36, the maximum voltage potential generated between the shield layer 36 and the heat tube 14 was in the order of 200 volts and therefore, only a minimal amount of insulation was needed to prevent partial discharge in either the insulation or the surrounding air. Absent grounding, however, a significant thickness for the protective jacket 42 would be required, the thickness being determined by the application of equation 2.

The present invention also provides a preferred method for serially joining lengths of the improved power cable. The splicing method is especially suited for power cable having concentric conductors, such as the improved cable illustrated in FIGS. 4 and 5.

Figure 6:
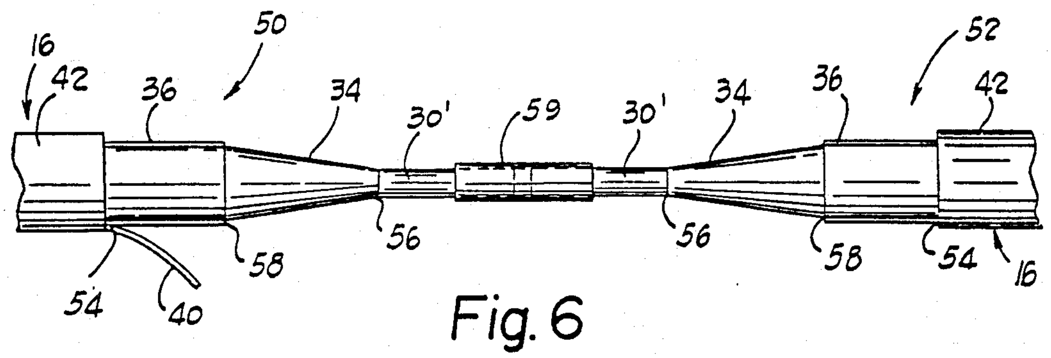
FIG. 6 illustrates one step of a cable splicing method disclosed by the present invention.
Figure 7:
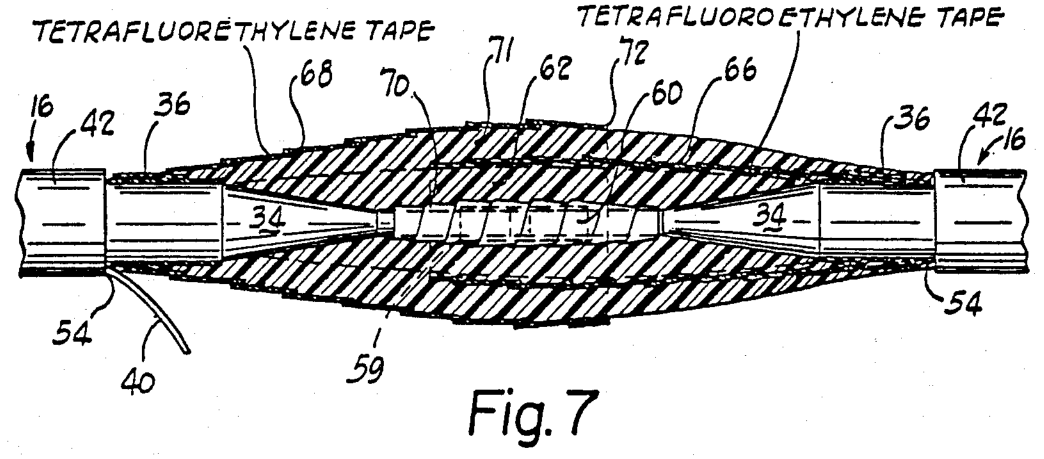
FIG. 7 illustrates another step of the splicing method.
Figure 8:
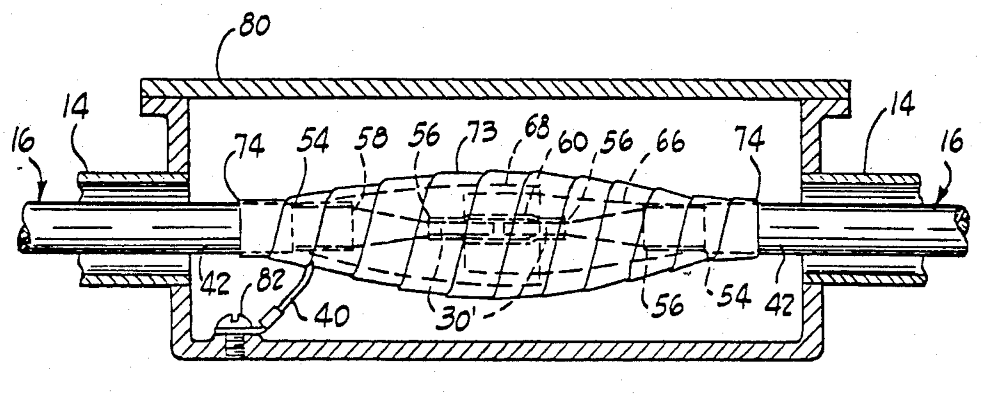
FIG. 8 illustrates the completed splice shown within a junction box.

FIGS. 6–8 illustrate the various steps that comprise the method for splicing together ends of the 5 kv power cable. Each cable length is considered to have a "terminal end", indicated generally by the reference character 50 and a "feed end", indicated generally by the reference character 52. FIG. 6 illustrates the initial steps of the splicing method. First, a portion of the outer protective jacket 42 is removed from each end 50, 52 to expose the shield layer 36, from the end of the cable to a point 54, on both the feed and terminal ends 50, 52. At the conclusion of this step (not shown), the shield layer 36 will be exposed from a position 54 to the extreme ends of each cable end 50, 52. Next, the shield layer 36, the primary insulation 34 and semiconductor layer 32 (not shown for clarity) are removed to expose the ends 30' of the primary conductor 30 from the extreme ends of the cable to a position indicated by the reference character 56. Next, the shield layer 36 is removed from a section of each cable end 50, 52 that extends between the position 56 and a position 58. The primary insulation 34 is preferably tapered, as seen in FIG. 6, between the positions 56 and 58.

Once the cable ends 50, 52 have been prepared in the above described manner, the exposed primary conductors 30' of each end 50, 52 are mechanically joined by a suitable joining device 59. In the preferred embodiment, the conductors 30' are joined by a CADWELL process, the apparatus and materials of which are available from Erico Products, Inc. Additional information regarding the process is available from Erico. It should be recognized that other joining methods such as welding, crimping, etc., are also feasible.

As seen in FIG. 7, the joined conductor ends are then covered with a semiconducting material 60, preferably spirally wrapped, carbonized tetrafluoroethylene (TFE) tape. The layer 60 extends between the positions 56 of each cable end 50, 52 to completely cover the exposed conductor ends 30'. An insulation layer 62 is then formed over the conductor junction and extends between the points 58 of the cable ends 50, 52. According to the preferred method, the insulation layer 62 is formed by an uncured, non-adhesive fluorocarbon polymer tape such as tetrafluoroethylene (TFE) that is spirally wrapped, with 50% overlap. In the exemplary embodiment, the TFE tape is wrapped until a layer approximately 30 mils thick is deposited. The layer is then heat fused by a suitable heat source such as a hot air gun. The wrapping and fusing steps are then repeated until a total insulation thickness of approximately 300 mils is formed.

According to the next step of the preferred embodiment, electrically isolated shield extensions 66, 68 are formed. The extension 66 for the feed end 52 is preferably formed by spirally wrapping carbonized TFE tape from the exposed shield layer 36 of the feed end 52 to a position 70 located on the far side of the conductor joint. In the preferred method, the carbonized TFE tape is wrapped until a layer approximately 30 mils thick is formed. The layer is then heat fused.

Insulation 71, preferably TFE tape is then wrapped around the shield extension 66 to electrically isolate the layer 66 from other layers. To achieve this step, insulating tape, preferably TFE tape is spirally wrapped over the shield extension 66, the taping preferably extending from the position 54 on the feed end 52 to the position 58 on the terminal end 50. The tape is wrapped until a layer approximately 30 mils thick is formed and the layer is then suitably heat fused.

The shield extension 68 is formed in a similar manner by spirally wrapping carbonized TFE tape beginning at the position 54 of the terminal end 50 to a position 72 on the far side of the conductor joint. Finally, a layer of insulation 73, preferably TFE tape is spirally wrapped over the entire splice between positions labeled 74, in FIG. 8, which are to the left and right of the positions 54 of the terminal and feed ends 50, 52, respectively. Preferably, this final insulation layer is approximately 30 mils thick. The exposed drain wire from the feed end 52 is removed. The drain wire 40 from the terminal end 50 is preferably grounded to the heat tube 14. As seen in FIG. 8, the splice is preferably enclosed within a junction box 80 which is electrically connected to the heat tube 14. Therefore, the drain wire 40 from the terminal end 50 is normally fastened to the junction box as seen in FIG. 8, by a fastener 82. Alternately, the drain wire can be suitably welded or brazed to the box 80.

It has been found that the disclosed splicing method provides a mechanically sound and low impedance junction which can withstand the same operating conditions to which the power cable is exposed. Specifically, the splice can withstand an applied voltage of 5 kv and a continuous operating temperature of 210° C. Moreover, the splice can be effected without the need for exotic or expensive equipment and therefore allows the heating system to be fabricated at remote locations where access to sophisticated equipment is severely restricted. The grounding of the shield 36 on the terminal end 50 to the heat tube at each splice location prevents the generation of an excessive voltage potential between the heat tube 14 and the shield 36, thereby reducing the insulation requirement around the shield.

If it becomes necessary to join a 3 kv cable to a 5 kv cable or, put another way, if it becomes necessary to join a shield type cable to a nonshield cable, the shield extension steps described above would be unnecessary.

Although the invention has been described with a certain degree of particularity, it should be understood that those skilled in the art can make various changes to the invention without departing from the spirit or scope of the invention as hereinafter claimed.

We claim:

1. A heating device for maintaining a pipe line or the like, at an elevated temperature utilizing the skin effect of alternating current, comprising:

(a) a ferromagnetic tube means in heat transfer relation with a pipe line to be heated;

(b) at least two lengths of power cable serially disposed in said ferromagnetic tube means, each cable length having a feed end and a terminal end and at least one cable length being capable of operating continuously with an applied voltage of at least 5 kv and at a continuous operating temperature of at least 210° C., said one cable length comprising:

(i) a stranded, nickel plated copper conductor surrounded by a layer of semiconductor material formed by spirally wrapping a carbonized, fluorocarbon polymer tape around said conductor;

(ii) a primary insulation layer surrounding said semiconductor layer, formed by a pressure extruded perfluoroalkoxy resin polymer;

(iii) a shield layer surrounding said primary insulation, comprising another semiconductor layer formed by spirally wrapping a carbonized fluorocarbon polymer tape around said primary insulation layer and at least one drain wire helically wound around said spirally wrapped fluorocarbon polymer tape; and, (iv) an outer insulation jacket surrounding said shield layer;

(c) a cable splice joining said lengths of power cable, comprising:

(i) a conductor juncture, mechanically joining the conductor ends of the feed end of one length of power cable to the terminating end of the other length of power cable;

(ii) a layer of semiconductor material surrounding said conductor junction, formed by spirally wrapping carbonized, tetrafluoroethylene tape around said joined conductors;

(iii) a layer of primary insulation surrounding said semiconductor layer formed by spirally wrapping and heat fusing, tetrafluoroethylene tape;

(iv) a discontinuous shield layer formed by spirally wrapped, semiconducting tape extending from the ends of each cable including portions in overlying, concentric relation;

(v) insulation insulating said overlying portions from each other;

(vi) means electrically communicating the shield layer of one of said lenghts of cable to said ferromagnetic tube;

(vii) a layer of insulation surrounding said cable splice, extending between the ends of said lengths of cable and formed by spirally wrapping tetrafluoroethylene tape.

2. The heating device of claim 1 wherein said cable splice is disposed within a junction box, said junction box forming part of said ferromagnetic tube means.

3. The heating device of claim 1 wherein one length of cable is rated at 5 kv and said other length of cable is rated at 3 kv.

4. A heating device for maintaining a pipe line or the like, at an elevated temperature utilizing the skin effect of alternating current, comprising:

(a) a ferromagnetic tube in heat transfer relation with a pipe line to be heated;

(b) at least two lengths of power cable serially disposed in said ferromagnetic tube, each cable length having a feed end and a terminal end and at least one cable length being capable of operating continuously with an applied voltage of at least 5 kv and at a continuous operating temperature of at least 210° C., said one cable length comprising:

(i) a centrally located conductor surrounded by a layer of semiconductor material;

(ii) a primary insulation layer surrounding said semiconductor layer;

(iii) a shield layer surrounding said primary insulation; and, (iv) an outer insulation jacket surrounding said shield layer;

(c) a cable splice joining said lengths of power cable, comprising:

(i) a conductor juncture, mechanically joining the conductor ends of the feed end of one length of power cable to the terminating end of the other length of power cable;

(ii) a layer of semiconductor material surrounding said conductor junction, formed by spirally wrapping carbonized, tetrafluoroethylene tape around said joined conductors;

(iii) a predetermined thickness of primary insulation surrounding said semiconductor layer, said predetermined thickness formed by spirally wrapping and heat fusing a plurality of layers of tetrafluoroethylene tape, each layer being less than said predetermined thickness such that a substantially void free insulation thickness is achieved which is at least as thick as the primary insulation thickness of said cables;

(iv) a discontinuous shield layer formed by spirally wrapped, semiconducting tape extending from the ends of each cable including portions in overlying, concentric relation;

(v) insulation insulating said overlying portions from each other;

(vi) means electrically communicating the shield layer of one of said lengths of cable to said ferromagnetic tube;

(vii) a layer of insulation surrounding said cable splice, extending between the ends of said lengths of said cable and formed by spirally wrapping and heat fusing tetrafluoroethylene tape such that said layer is substantially void free and is at least as thick as the outer insulation jacket of said cables.

* * * * *